(12) United States Patent
Benoit

(10) Patent No.: US 10,219,354 B2
(45) Date of Patent: Feb. 26, 2019

(54) METHOD AND SYSTEM FOR SYNCHRONIZING LIGHTING TO MUSIC

(71) Applicant: 9255-7248 QUÉBEC INC., Ville Mont-Royal (CA)

(72) Inventor: Philippe Benoit, Outremont (CA)

( * ) Notice: Subject to any disclaimer, the term of this patent is extended or adjusted under 35 U.S.C. 154(b) by 0 days.

(21) Appl. No.: 15/675,488

(22) Filed: Aug. 11, 2017

(65) Prior Publication Data

US 2018/0049298 A1 Feb. 15, 2018

Related U.S. Application Data

(60) Provisional application No. 62/374,576, filed on Aug. 12, 2016.

(51) Int. Cl.
*H05B 37/02* (2006.01)
*F21V 33/00* (2006.01)
*H04R 1/02* (2006.01)
*F21V 14/00* (2018.01)
*G06F 3/16* (2006.01)
*F21W 121/00* (2006.01)

(52) U.S. Cl.
CPC ......... *H05B 37/0236* (2013.01); *F21V 14/00* (2013.01); *F21V 33/0056* (2013.01); *G06F 3/162* (2013.01); *H04R 1/028* (2013.01); *H05B 37/029* (2013.01); *H05B 37/0272* (2013.01); *F21W 2121/00* (2013.01)

(58) Field of Classification Search
CPC .............. H05B 37/029; H05B 37/0236; H05B 37/0272; H05B 33/0842; H05B 37/0218; H05B 37/0245; H05B 33/0845; H05B 33/0863; H05B 37/0254; A63J 17/00; F21V 33/0056; G10H 2240/325; G10H 1/368; G10H 2220/081; F21S 10/00; G06F 3/162

See application file for complete search history.

(56) References Cited

U.S. PATENT DOCUMENTS 7,228,190 B2 * 6/2007 Dowling .................. A63J 17/00
340/815.46
7,473,837 B2 * 1/2009 Cui .......................... A63J 17/00
84/464 R (Continued)

FOREIGN PATENT DOCUMENTS

CA   1037446   8/1978
CA   1081193   7/1980

(Continued)

*Primary Examiner* — Vibol Tan
(74) *Attorney, Agent, or Firm* — Praxis

(57) ABSTRACT

A system for synchronizing lighting to music, comprising a projector having at least one light source for projecting light onto a surface, an I/O interface having a receiver for receiving a music audio signal and a processor in communication with the projector and the I/O interface The processor has an associated memory including instructions stored thereon, that when executed by the processor, perform the steps of acquiring the music audio signal from the I/O interface and modifying in real-time at least one parameter of the at least one light source based on at least one parameter of the music audio signal. In use the light projected by the at least one light source illuminates the surface in synchronization with the music audio signal.

20 Claims, 8 Drawing Sheets

(56) References Cited

U.S. PATENT DOCUMENTS

| | | | | |
|---|---|---|---|---|
| 7,754,960 B2 * | 7/2010 | Yamamoto | ............... | A63J 17/00 84/464 R |
| 7,993,042 B2 * | 8/2011 | Padilla | ..................... | B60Q 3/80 362/488 |
| 8,008,561 B2 * | 8/2011 | Brenner | ................. | G09B 15/00 84/464 R |
| 8,476,835 B1 | 7/2013 | Parisi | | |
| 8,569,606 B2 * | 10/2013 | Khoo | ..................... | G10H 1/368 84/609 |
| 8,581,513 B1 * | 11/2013 | Reinoso | ............. | H05B 37/0272 315/185 S |
| 9,398,670 B2 * | 7/2016 | Kidakarn | ........... | H05B 37/0272 |
| 9,433,066 B2 * | 8/2016 | Burkhart | ............ | H05B 33/0863 |
| 9,458,994 B1 | 10/2016 | Khubani et al. | | |
| 9,546,775 B1 | 1/2017 | Khubani et al. | | |
| 9,562,673 B1 | 2/2017 | Khubani et al. | | |
| 2005/0275626 A1 * | 12/2005 | Mueller | ............. | H05B 37/0245 345/156 |
| 2015/0222975 A1 * | 8/2015 | Huang | ................... | H04R 1/028 381/332 |

FOREIGN PATENT DOCUMENTS

| | | |
|---|---|---|
| CA | 2906786 | 9/2014 |
| WO | 0105195 | 1/2001 |

* cited by examiner

METHOD AND SYSTEM FOR SYNCHRONIZING LIGHTING TO MUSIC

CROSS-REFERENCE TO RELATED APPLICATIONS

This application claims the benefits of U.S. provisional patent application No. 62/374,576 filed on Aug. 12, 2016, which is herein incorporated by reference.

TECHNICAL FIELD

The present disclosure relates to a method and system for synchronizing lighting to music.

BACKGROUND

Exterior home decoration, in particular for Holidays such as Christmas, can be quite time consuming and expensive in order to make a magical atmosphere that will be admired by passersby. Lights have to be installed manually all over the home, which is time consuming, and often have to be replaced, which can be costly. Furthermore, placement of lights in locations high off the ground, for example at the border of the roof, can be dangerous as the person installing the lights is at risk of a fall.

Accordingly, there is a need for method and system for synchronizing lighting to music that alleviates theses disadvantages.

SUMMARY

The present disclosure provides a system for synchronizing lighting to music, comprising:
  a projector having at least one light source for projecting light onto a surface;
  an I/O interface having a receiver for receiving a music audio signal; and
  a processor in communication with the projector and the I/O interface, the processor having an associated memory including instructions stored thereon, that when executed by the processor, perform the steps of:
    acquiring the music audio signal from the I/O interface; and
    modifying in real-time at least one parameter of the at least one light source based on at least one parameter of the music audio signal;
  wherein in use the light projected by the at least one light source illuminates the surface in synchronization with the music audio signal.

The present disclosure also provides a system for synchronizing lighting to music as described above, further comprising a speaker for converting the music audio signal to music.

The present disclosure further provides a system for synchronizing lighting to music as described above, wherein the projector further includes a motion assembly having optical elements configured to cause a projected light path change for the light projected by some or all of the at least one light source and wherein the instructions, when executed by the processor, further perform the step of modifying at least one of a speed or a direction of movement of the motion assembly based on at least one parameter of the music audio signal.

The present disclosure also provides a system for synchronizing lighting to music as described above, wherein the instructions, when executed by the processor, further perform the steps of:
  randomly modifying the at least one parameter of the at least one light source; and/or
  randomly modifying at least one of a speed or direction of movement of the motion assembly.

The present disclosure further provides a system for synchronizing lighting to music as described above, wherein the at least one light source is selected from a group consisting of a laser and a light emitting diode, the at least one light source parameter is selected from a group consisting of intensity, color component and duration and the at least one music audio signal parameter is selected from a group consisting of frequency, amplitude, frequency range and amplitude range.

The present disclosure also provides a system for synchronizing lighting to music as described above, further comprising a sensor configured for detecting the presence of an individual in order to activate the system for synchronizing lighting to music, the sensor being a movement detector or a sound detector, and may also include a camera or a microphone.

The present disclosure further provides a system for synchronizing lighting to music as described above, further comprising a heater configured for keeping the at least one light source at an operational temperature.

The present disclosure also provides a system for synchronizing lighting to music as described above, further comprising a power unit configured for providing power to the system for synchronizing lighting to music, the power unit taking the form of at least one battery or a solar panel with at least one associated battery.

The present disclosure further provides a system for synchronizing lighting to music as described above, wherein the receiver is a transceiver and wherein the instructions, when executed by the processor, further perform the step of synchronizing a plurality of system for synchronizing lighting to music to the music audio signal through the input/output (I/O) interface and/or providing the music audio signal to a plurality of remote speakers through the input/output (I/O) interface.

The present disclosure also provides a system for synchronizing lighting to music as described above, further comprising a user interface for controlling the system for synchronizing lighting to music, the user interface consisting of a remote controller, a web server or an application server.

The present disclosure further provides a system for synchronizing lighting to music as described above, wherein the instructions, when executed by the processor, further perform the step of playing audio files stored on a remote data storage device through the input/output (I/O) interface or in a data storage space within the memory associated with the processor.

BRIEF DESCRIPTION OF THE FIGURES

Embodiments of the disclosure will be described by way of examples only with reference to the accompanying drawing, in which.

Similar references used in different Figures denote similar components.

DETAILED DESCRIPTION

Generally stated, the non-limitative illustrative embodiment of the present disclosure provide a method and system for synchronizing lighting to music, more specifically a method and system for illuminating a landscape as well as the outside or inside of a home in synchronization with music.

Figure 1:
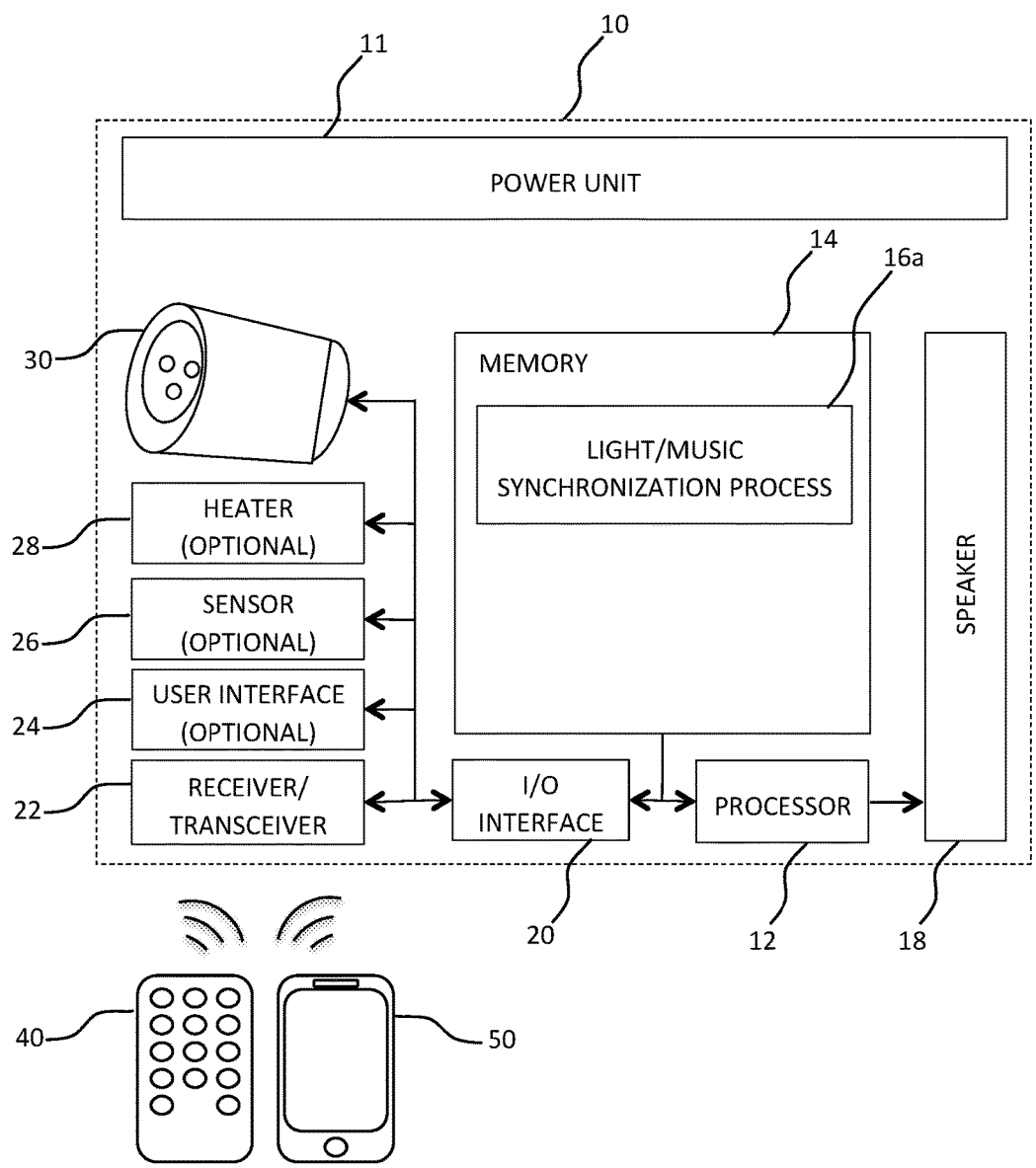
FIG. 1 is schematic representation of a system for synchronizing lighting to music in accordance with a first illustrative embodiment of the present disclosure.

Referring to FIG. 1, there is shown the system for synchronizing lighting to music 10 in accordance with a first illustrative embodiment of the present disclosure, which generally comprises a power unit 11, processor 12 with an associated memory 14 having stored therein processor executable instructions to be executed by the processor 12 to perform the various processes of the system for synchronizing lighting to music 10, a speaker 18, an input/output (I/O) interface 20, a receiver/transceiver 22, an optional user interface (UI) 24, an optional sensor 26, an optional heater 28 and a projector 30.

The power unit 11, which provides power to the various components of the system for synchronizing lighting to music 10, may be in the form of batteries, a power cord or other source of power, with power converter/transformer, if applicable, as known in the art.

The input/output (I/O) interface 20 and receiver/transceiver 22 are configured for connection with a remote controller 40, via WiFi, Bluetooth, RF or other wireless communication technology, allowing a user to remotely control the system for synchronizing lighting to music 10. For example, the remote controller 40 can include buttons or selectors for powering ON/OFF the system for synchronizing lighting to music 10, enabling/selecting various parameters such as colors, patterns, speed, direction, various Holiday themes, sound level, selection of songs/audio files, etc. The input/output (I/O) interface 20 and receiver/transceiver 22 are also configured for connection to a music source 50, via WiFi, Bluetooth or other wireless communication technology, for example a smart phone, iPod™, tablet PC, laptop computer, DVD player, game console or other such device, to the system for synchronizing lighting to music 10.

In an alternative embodiment, an optional user interface 24 may be provided physically on the system for synchronizing lighting to music 10 in order to control its operations. The user interface 24 may be a simple as an ON/OFF commuter switch or include various buttons or selectors for controlling the system for synchronizing lighting to music 10. For example, the user interface 24 may include buttons or selectors for enabling/selecting, as per the remote controller 40, various parameters such as colors, patterns, speed, direction, various Holiday themes, sound level, selection of songs/audio files, etc.

In a further alternative embodiment, user interface 24 may the take the form of a web or application server, which can be accessed, for example, from a smart phone, tablet PC, laptop computer or other such device, running a browser application or app for controlling the system for synchronizing lighting to music 10.

In another alternative embodiment, an optional sensor 26 may be provided for detecting the presence of one or more individuals in the vicinity of the system for synchronizing lighting to music 10 in order to activate it. The sensor 26 may be a movement detector, sound detector or other such sensor, and may also include a camera and/or microphone enabling the surveillance of a structure at which the system for synchronizing lighting to music 10 is aimed.

The system for synchronizing lighting to music 10 can be programmed to always remain active when powered or in various alternative embodiments, remain active for a specified period of time, activate at specific hours or range of hours, activate by a user or activate automatically when the sensor 26 detects the presence of one of more individuals.

In yet another alternative embodiment, an optional heater 28 may be provided to keep the components of the system for synchronizing lighting to music 10, especially the projector 30, at a specified range of temperatures to protect and/or keep components at an optimal operational temperature, which is useful especially in cold weather such as the Holidays where such system is used outdoors in the cold.

The projector 30 can take various forms, such as a digital projector, RGB, monochrome, diode, laser, LED or other light sources and be of varying definition, number of light sources and/or wavelength range. The projector 30 may also include a motion assembly provided with optical elements (mirrors, lenses, etc.) and motor/gears configured to cause a change in the path of the light projections from the light source, thus moving the light projections along a surface. It is to be understood that the light/music synchronization process 16a is configured to address the specific characteristics of the light source and/or motion assembly of the projector 30.

The memory 14 has stored therein the light/music synchronization process 16a to be executed by the processor 12 in order to synchronize light projections of the projector 30 with an audio signal from the music source 50, which is played through the speaker 18. It is to be understood that in an alternative embodiment, the speaker 18 may be omitted and the audio signal from the music source 50 played on a remote speaker not linked to the system for synchronizing lighting to music 10.

The light/music synchronization process 16a includes an algorithm that modifies at least one of the intensity and/or duration of at least one of the pixel, diode, laser, led or other light source projection of the projector 30, and/or, if present, speed and/or direction of movement of the motion assembly, based on the frequency and/or amplitude, or distinct ranges thereof, of the audio signal from the music source 50. In one example, the amplitude of the sound signal (or power from a sound amplifier) can be used to modulate the brightness of the light source (or power provided to the light source). Further to this, color components of the light source may be assigned to frequency ranges of the sound signal, the brightness of those color components depending on the amplitude of the corresponding frequencies. Furthermore, random changes in intensity, duration of at least one of the pixel, diode, laser, led or other light source projection of the projector 30, along with random speed and/or direction of movement of the motion assembly of the projector 30 (for example speed and/or direction of rotation of a motor), may also be enabled.

Figure 2:
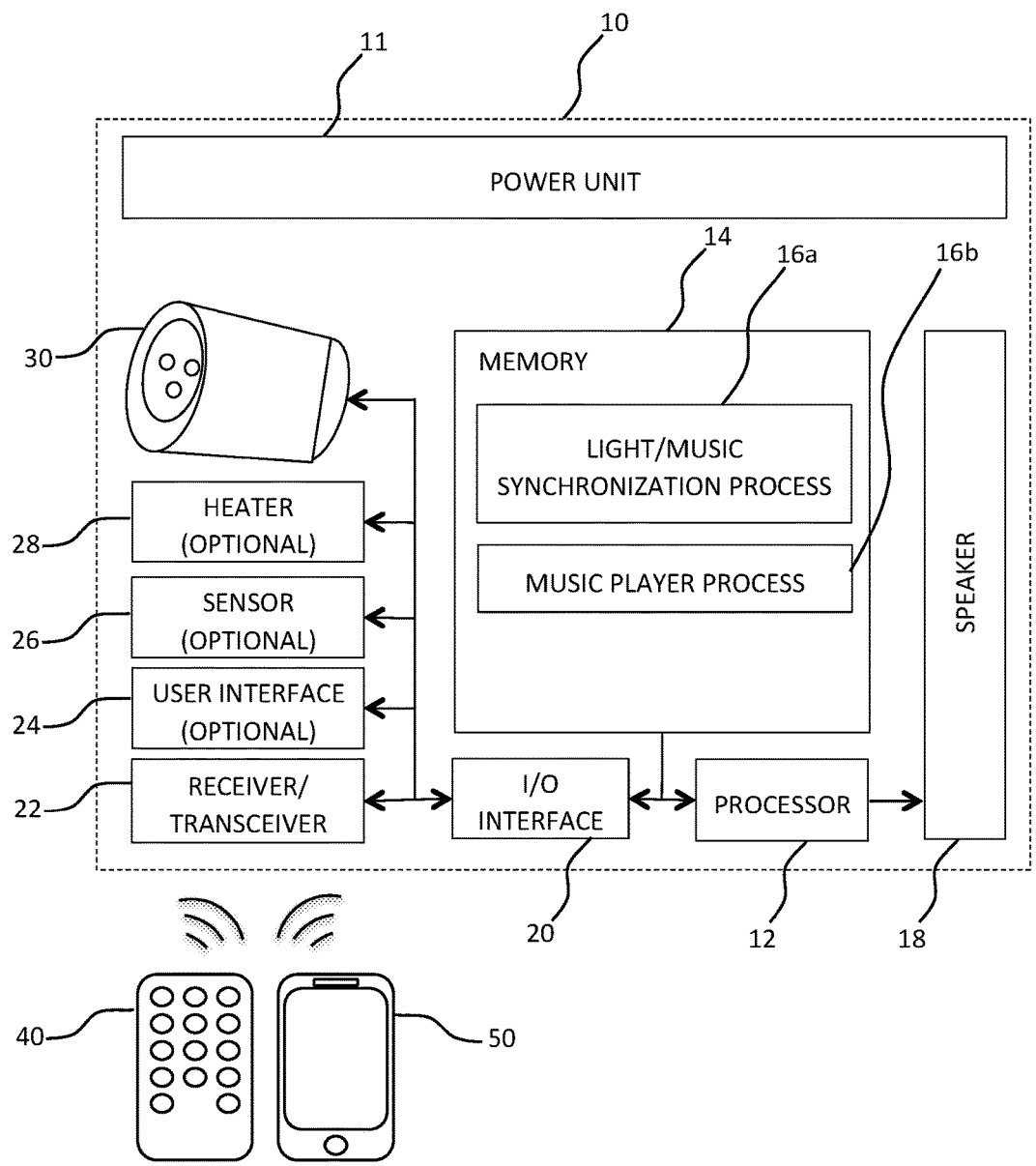
FIG. 2 is schematic representation of a system for synchronizing lighting to music in accordance with a second illustrative embodiment of the present disclosure.

Referring to FIG. 2, there is shown the system for synchronizing lighting to music 10 in accordance with a second illustrative embodiment of the present disclosure, which further includes a music player process 16b, stored within the memory 14, allowing the system for synchronizing lighting to music 10 to receive and play audio files, such as MP3, MPEG-4, WAV, WMA or other audio file format, from the music source 50 instead of an audio signal, the music player process 16b including the appropriate codecs for the selected audio file formats. Accordingly, the light projections of the projector 30 are synchronized with the audio signal from the music player process 16b.

Figure 3:
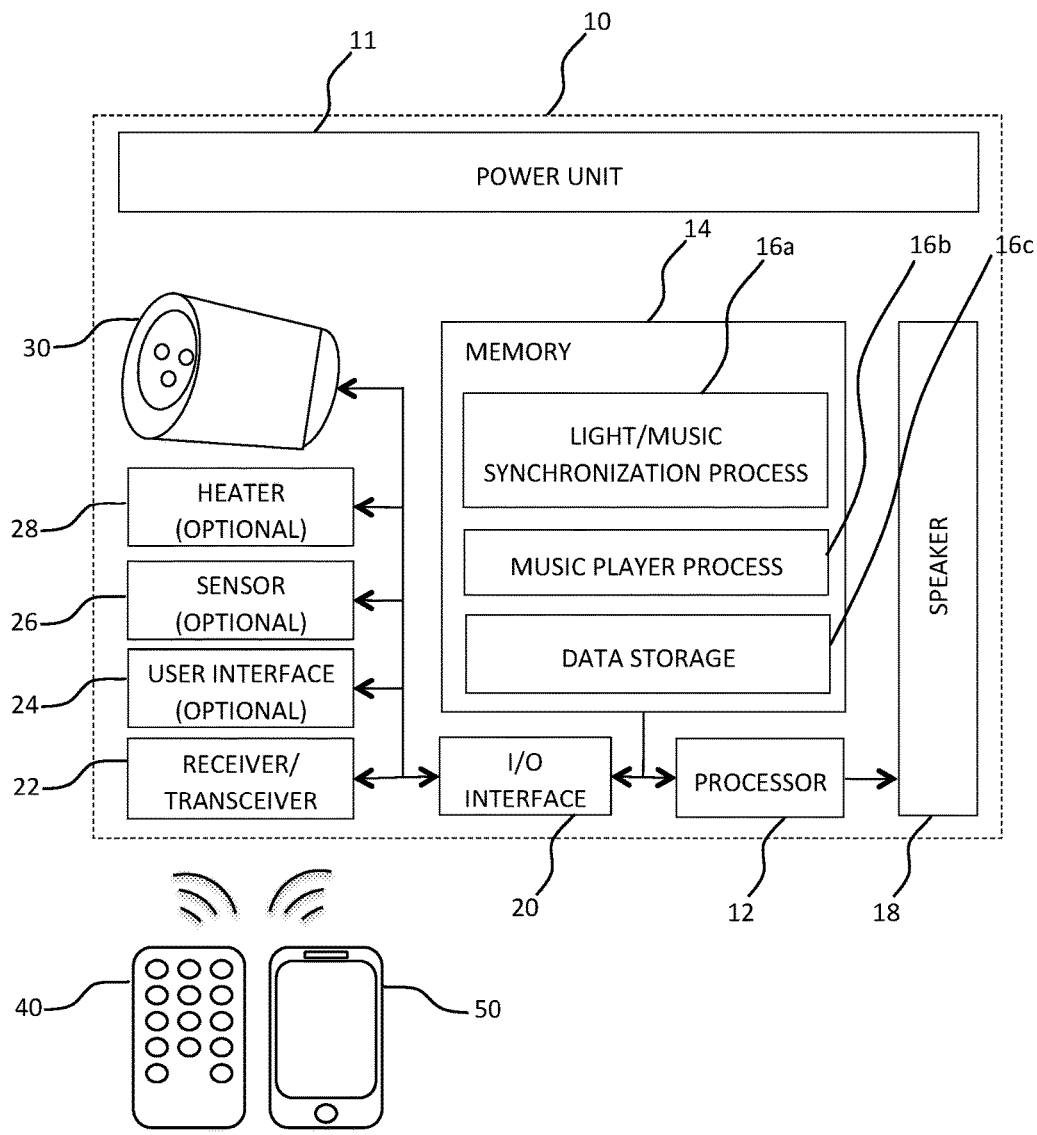
FIG. 3 is schematic representation of a system for synchronizing lighting to music in accordance with a third illustrative embodiment of the present disclosure.

Referring to FIG. 3, there is shown the system for synchronizing lighting to music 10 in accordance with a third illustrative embodiment of the present disclosure, which further includes data storage space 16c within the memory 14 in order to store therein audio files downloaded via the input/output (I/O) interface 20 and receiver/transceiver 22.

Figure 4:
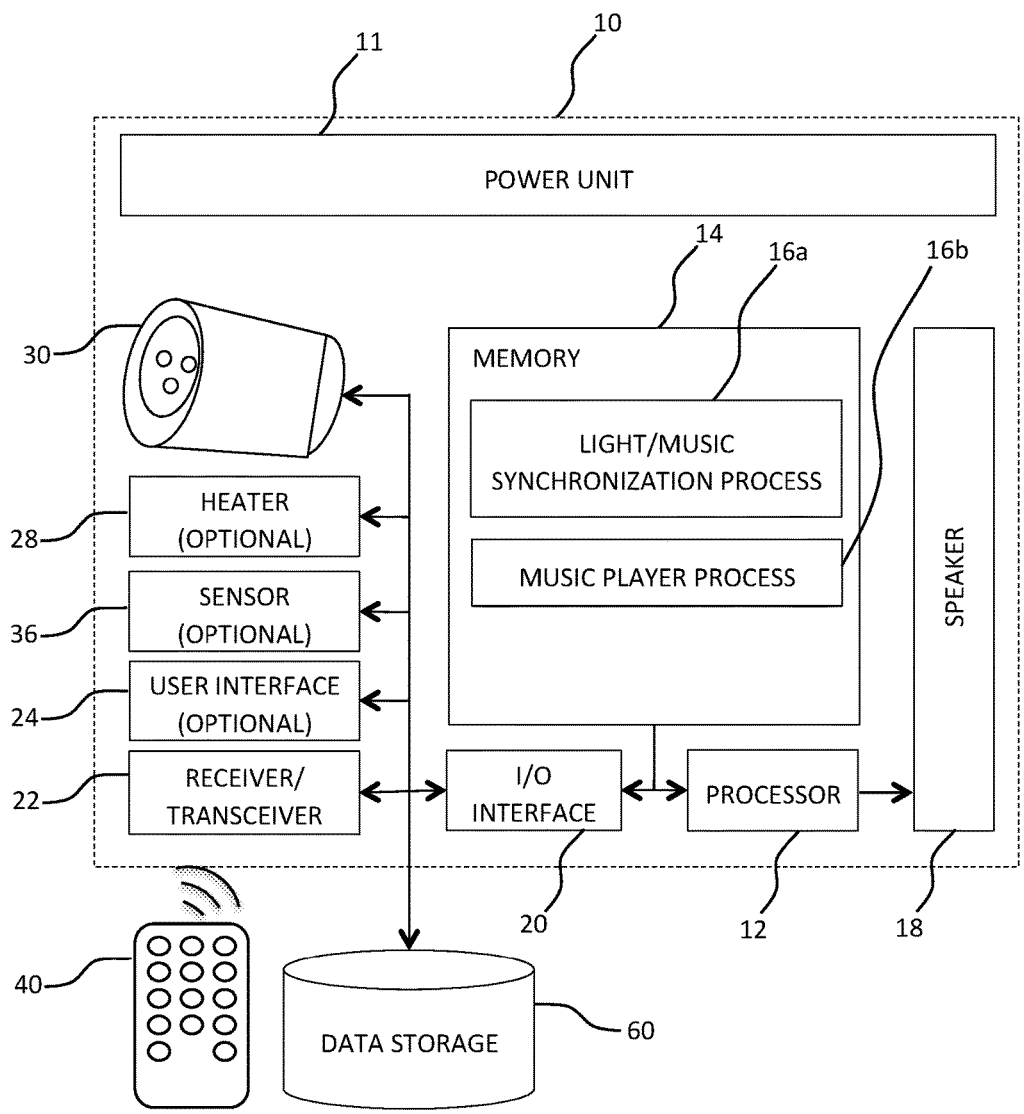
FIG. 4 is schematic representation of a system for synchronizing lighting to music in accordance with a fourth illustrative embodiment of the present disclosure.

Referring to FIG. 4, there is shown the system for synchronizing lighting to music 10 in accordance with a fourth illustrative embodiment of the present disclosure, wherein the input/output (I/O) interface 20 includes one or more connectors, such as USB, Firewire, Thunderbolt, etc., for connecting an external data storage device 60 for storing thereon music data files, for example a smart phone, iPod™, tablet PC, laptop computer, DVD player, game console, hard disk, SSD drive, USB key or other such data storage device, to the system for synchronizing lighting to music 10 for playing using the music player process 16b.

It is to be understood that in an alternative embodiment both the data storage space 16c (see FIG. 3) and the external data storage device 60 (see FIG. 4) may be present.

Figure 5:
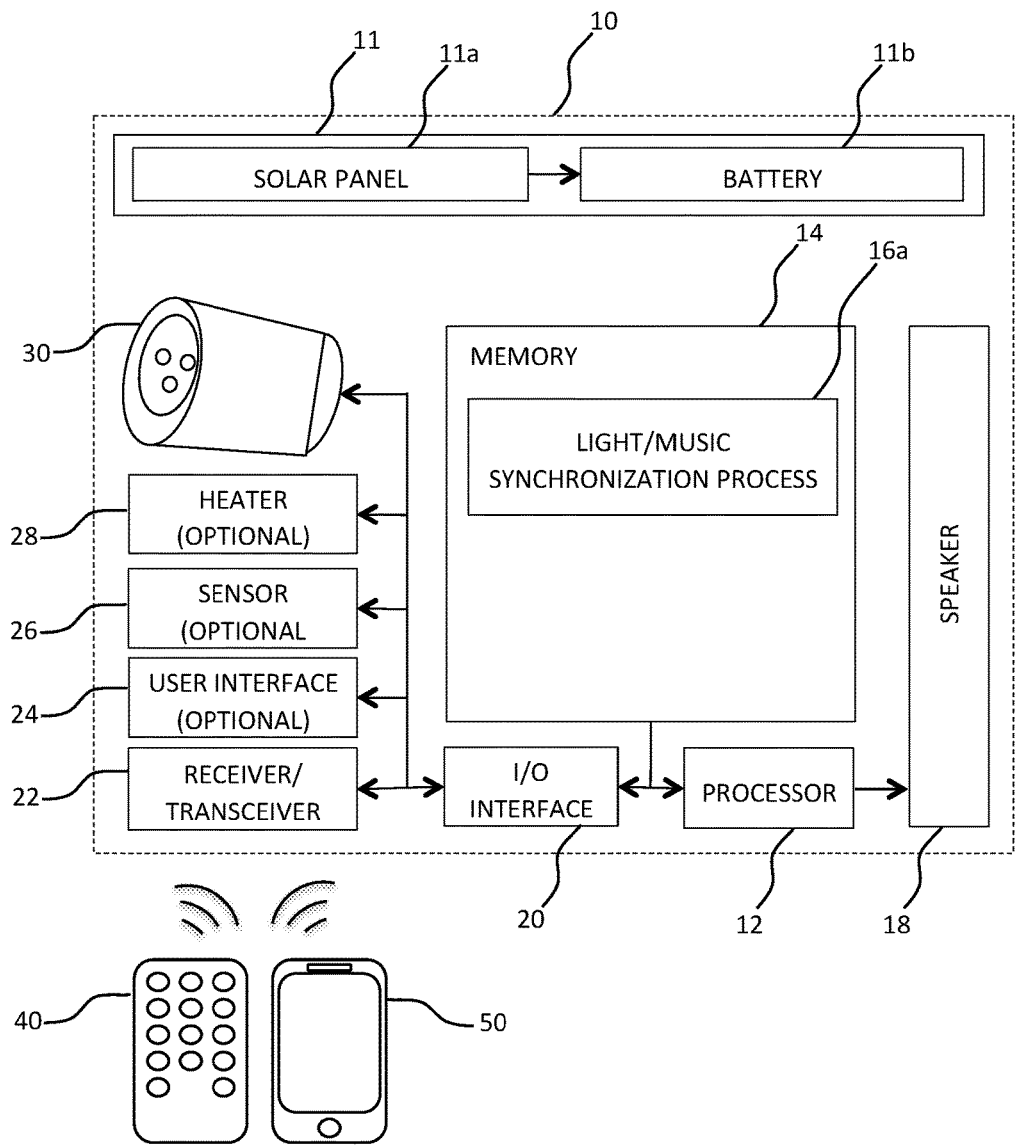
FIG. 5 is schematic representation of a system for synchronizing lighting to music in accordance with a fifth illustrative embodiment of the present disclosure.

Referring to FIG. 5, there is shown the system for synchronizing lighting to music 10 in accordance with a fifth illustrative embodiment of the present disclosure, wherein the power unit 11 takes the form of a solar panel 11a with an associated battery 11b for providing power to the system for synchronizing lighting to music 10.

Figure 6:
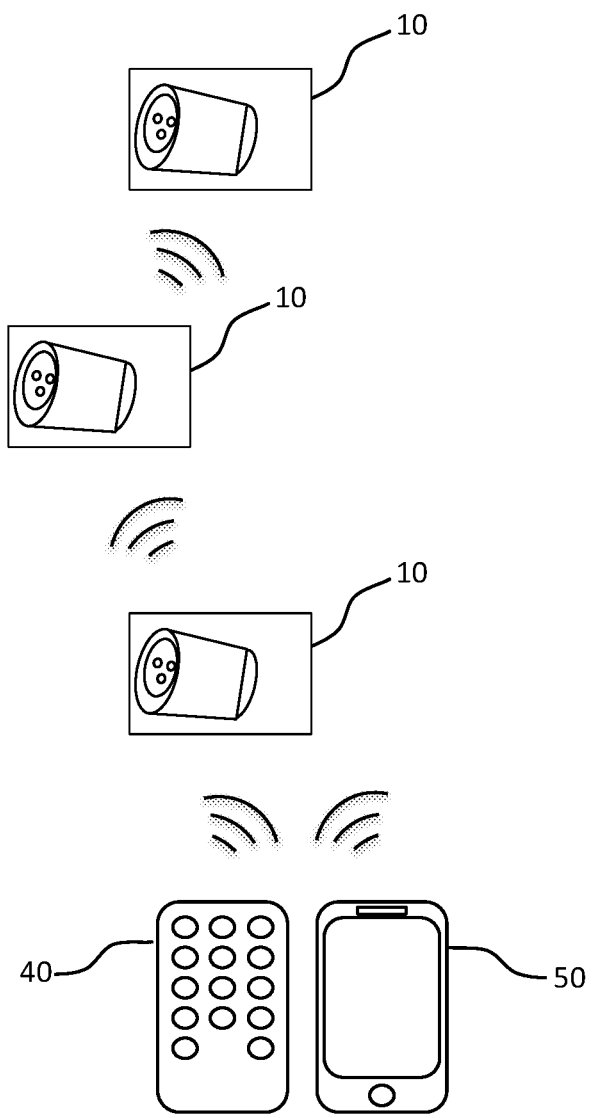
FIG. 6 is schematic representation of a network of systems for synchronizing lighting to music.

Referring now to FIG. 6, there is shown a network of systems for synchronizing lighting to music 10, which are all synchronized to the same music source 50 via, for example, a Bluetooth network through their respective input/output (I/O) interface 20 and receiver/transceiver 22. It is to be understood that other networking technologies may be used, for example, WiFi or other wireless communication technology. The synchronization may be handled by the light/music synchronization process 16a or by a dedicated networking process stored in the memory 14.

Figure 7:
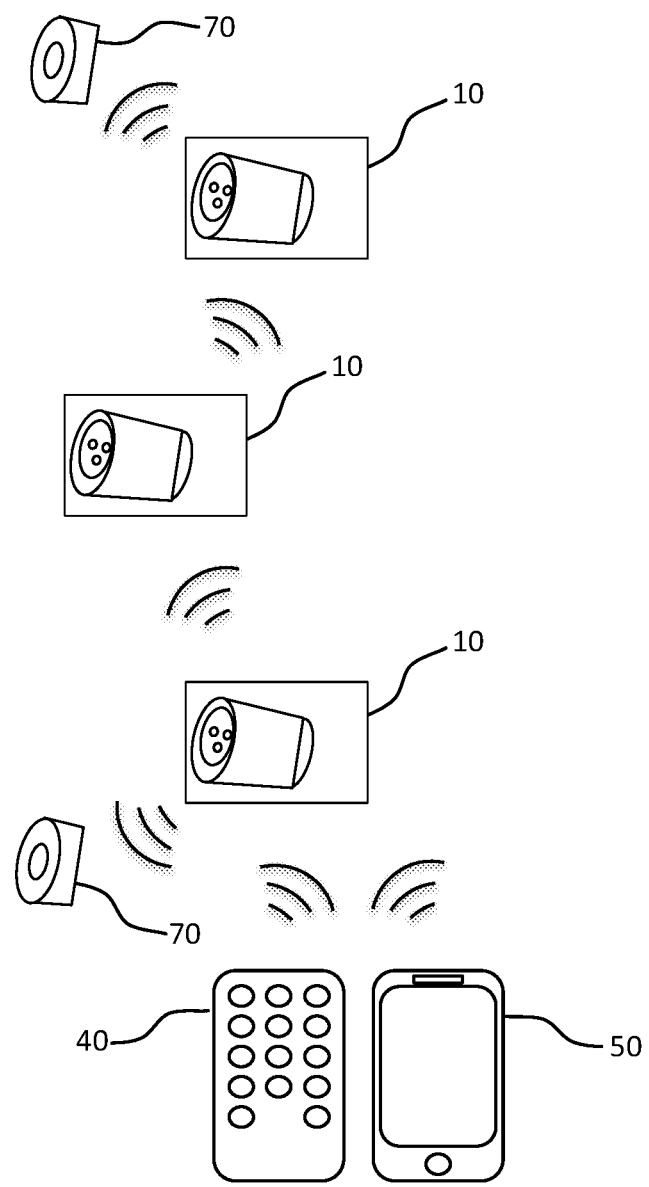
FIG. 7 is schematic representation of a network of systems for synchronizing lighting to music with remote speakers.

Referring now to FIG. 7, there is shown another network of systems for synchronizing lighting to music 10, further comprising remote speakers 70 networked with one or more system for synchronizing lighting to music 10 via, for example, a Bluetooth network through the respective input/output (I/O) interface 20 and receiver/transceiver 22 of the systems for synchronizing lighting to music 10. It is to be understood that other networking technologies may be used, for example, WiFi or other wireless communication technology. The synchronization may be handled by the light/music synchronization process 16a or by a dedicated networking process stored in the memory 14.

It is to be understood that in alternative embodiments, the networked systems for synchronizing lighting to music 10 and/or the remote speakers 70 may also be in communication via wired links or a combination of wired and wireless links.

It is to be further understood that depending on the embodiment of the system for synchronizing lighting to music 10, the receiver/transceiver 22 may be a receiver or a transceiver depending on whether one-way or two-way communication is required.

Figure 8:
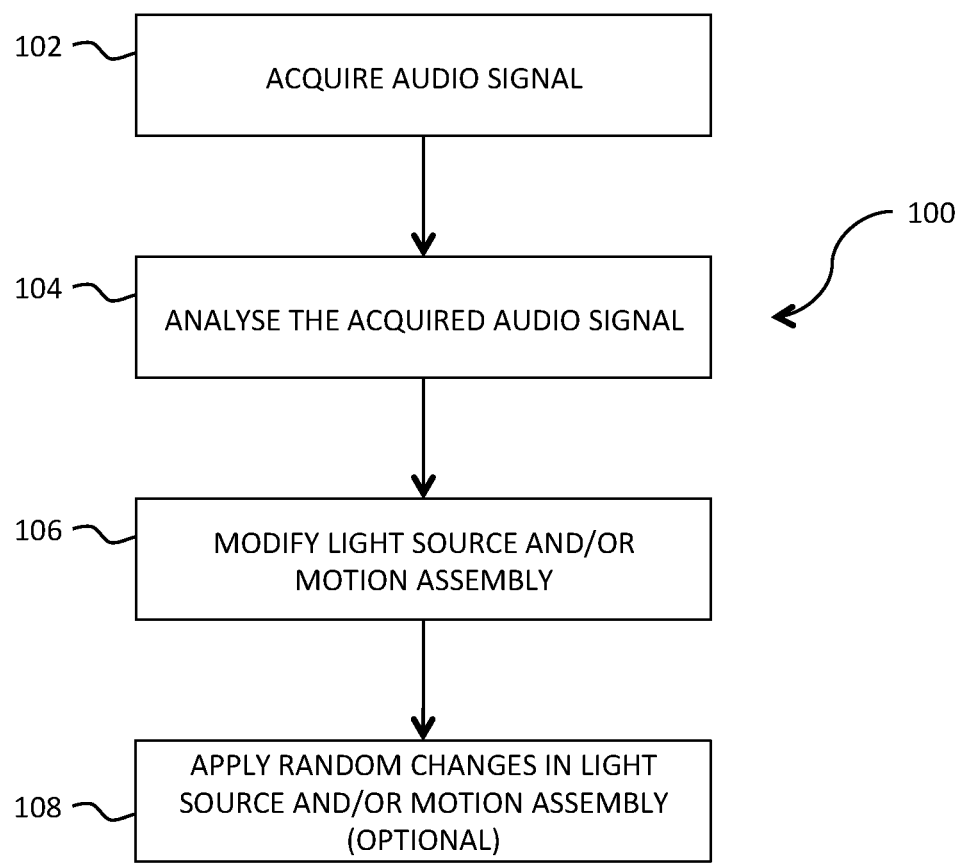
FIG. 8 is a flow diagram of the light/music synchronization process in accordance with an illustrative embodiment of the present disclosure.

Referring to FIG. 8, there is shown a flow diagram of an illustrative embodiment of the algorithm 100 of the light/music synchronization process 16a executed by the processor 12. Steps of the algorithm 100 are indicated by blocks 102 to 108.

The algorithm 100 starts at block 102 where an audio signal is acquired either from a music source 50 or the music player process 16b.

At block 104, the algorithm 100 analyses the received audio signal and determines the frequency and/or amplitude of the signal in real-time.

Then, at block 106, the algorithm 100 modifies in real-time at least one of the intensity or duration of at least one of the light sources (pixel, laser, led or diode, etc.) from the projector 30 based on the frequency and/or amplitude, or distinct ranges thereof, of the audio signal. Color components of the light sources may be assigned to frequency ranges of the sound signal, the brightness of those color components depending on the amplitude of the corresponding frequencies. In the case where the projector 30 includes a motion assembly, the algorithm may also modify the speed and/or direction of movement of the motion assembly based on the frequency and/or amplitude, or distinct ranges thereof, of the audio signal.

Optionally, at block 108, random changes in intensity or duration of at least one of the light sources from the projector 30 may be applied and/or, in the case where the projector 30 includes a motion assembly, random changes in the speed and/or direction of movement of the motion assembly.

It is to be understood that the various features of the described illustrative embodiments of the system for synchronizing lighting to music 10 may be rearranged in different combinations than those shown and that for the sake of brevity the shown illustrative embodiments do not represent an exhaustive list of all possible combinations.

Although the present disclosure has been described with a certain degree of particularity and by way of illustrative embodiments and examples thereof, it is to be understood that the present disclosure is not limited to the features of the embodiments described and illustrated herein, but includes all variations and modifications within the scope of the disclosure as hereinafter claimed.

What is claimed is:

1. A system for synchronizing lighting to music, comprising:

a projector having at least one light source for projecting light onto a surface and a motion assembly having optical elements configured to cause a projected light path change for the light projected by some or all of the at least one light source;

an I/O interface having a receiver for receiving a music audio signal; and a processor in communication with the projector and the I/O interface, the processor having an associated memory including instructions stored thereon, that when executed by the processor, perform the steps of:
acquiring the music audio signal from the I/O interface; and modifying in real-time at least one parameter of the at least one light source based on at least one parameter of the music audio signal;

wherein in use the light projected by the at least one light source illuminates the surface in synchronization with the music audio signal.

2. A system for synchronizing lighting to music in accordance with claim 1, further comprising:

a speaker for converting the music audio signal to music.

3. A system for synchronizing lighting to music in accordance with claims 1, wherein the instructions, when executed by the processor, further perform the step of:

randomly modifying the at least one parameter of the at least one light source.

4. A system for synchronizing lighting to music in accordance with claim 1, wherein the instructions, when executed by the processor, further perform the step of:

modifying at least one of a speed or a direction of movement of the motion assembly based on at least one parameter of the music audio signal.

5. A system for synchronizing lighting to music in accordance with claim 1, wherein the instructions, when executed by the processor, further perform the step of:

randomly modifying at least one of a speed or direction of movement of the motion assembly.

6. A system for synchronizing lighting to music in accordance with claim 1, wherein the at least one light source is selected from a group consisting of a laser and a light emitting diode.

7. A system for synchronizing lighting to music in accordance with claim 1, wherein the at least one light source parameter is selected from a group consisting of intensity, color component and duration.

8. A system for synchronizing lighting to music in accordance with claim 1, wherein the at least one music audio signal parameter is selected from a group consisting of frequency, amplitude, frequency range and amplitude range.

9. A system for synchronizing lighting to music in accordance with claim 1, further comprising a sensor configured for detecting the presence of an individual in order to activate the system for synchronizing lighting to music.

10. A system for synchronizing lighting to music in accordance with claim 9, wherein the sensor is selected from a group consisting of a movement detector and a sound detector.

11. A system for synchronizing lighting to music in accordance with claim 9, wherein the sensor includes at least one of a camera and a microphone.

12. A system for synchronizing lighting to music in accordance with claim 1, further comprising a heater configured for keeping the at least one light source at an operational temperature.

13. A system for synchronizing lighting to music in accordance with claim 1, further comprising a power unit configured for providing power to the system for synchronizing lighting to music, the power unit being selected from a group consisting of at least one battery and a solar panel with at least one associated battery.

14. A system for synchronizing lighting to music in accordance with claim 1, wherein the receiver is a transceiver.

15. A system for synchronizing lighting to music in accordance with claim 14, wherein the instructions, when executed by the processor, further perform the step of:

synchronizing a plurality of system for synchronizing lighting to music to the music audio signal through the input/output (I/O) interface.

16. A system for synchronizing lighting to music in accordance with claim 14, wherein the instructions, when executed by the processor, further perform the step of:

providing the music audio signal to a plurality of remote speakers through the input/output (I/O) interface.

17. A system for synchronizing lighting to music in accordance with claim 1, further comprising a user interface for controlling the system for synchronizing lighting to music.

18. A system for synchronizing lighting to music in accordance with claim 17, wherein the user interface is selected from a group consisting of a remote controller, a web server and an application server.

19. A system for synchronizing lighting to music in accordance with claim 1, wherein the instructions, when executed by the processor, further perform the step of:

playing audio files stored on a remote data storage device through the input/output (I/O) interface or in a data storage space within the memory associated with the processor.

20. A system for synchronizing lighting to music, comprising:

a projector having at least one light source for projecting light onto a surface;

an I/O interface having a transceiver for receiving a music audio signal; and a processor in communication with the projector and the I/O interface, the processor having an associated memory including instructions stored thereon, that when executed by the processor, perform the steps of:

acquiring the music audio signal from the I/O interface;

modifying in real-time at least one parameter of the at least one light source based on at least one parameter of the music audio signal; and providing the music audio signal to a plurality of remote speakers through the input/output (I/O) interface wherein in use the light projected by the at least one light source illuminates the surface in synchronization with the music audio signal.

* * * * *